United States Patent
Moon et al.

(10) Patent No.: US 9,944,544 B2
(45) Date of Patent: Apr. 17, 2018

(54) 3-DIMENSIONAL POROUS MONO-POLAR ELECTRODE BODY, ELECTRIC STERILIZATION FILTER INCLUDING 3-DIMENSIONAL POROUS MONO-POLAR ELECTRODE BODY, AND WATER TREATMENT METHOD USING 3-DIMENSIONAL POROUS MONO-POLAR ELECTRODE BODY

(71) Applicants: Elchemtech Co., Ltd., Seoul (KR); Sang Bong Moon, Seoul (KR)

(72) Inventors: Sang Bong Moon, Seoul (KR); Hye Young Jung, Seoul (KR); Yun Ki Choi, Seoul (KR); So Young Kim, Gyeonggi-do (KR); Dae Jin Yoon, Gyeonggi-do (KR); Ja Young Kim, Seoul (KR); Su Hyun Im, Gyeonggi-do (KR); Min Ah Song, Gyeonggi-do (KR); Tae Lim Lee, Seoul (KR); Chang Hwan Moon, Seoul (KR); Ji Yeong Kim, Gyeonggi-do (KR); Jun Young Lee, Gyeonggi-do (KR); Sung Won Choi, Gyeonggi-do (KR)

(73) Assignees: Elchemtech Co., Ltd., Seoul (KR); Sang Bong Moon, Seoul (KR)

( * ) Notice: Subject to any disclaimer, the term of this patent is extended or adjusted under 35 U.S.C. 154(b) by 136 days.

(21) Appl. No.: 15/074,328

(22) Filed: Mar. 18, 2016

(65) Prior Publication Data

US 2017/0267552 A1  Sep. 21, 2017

(30) Foreign Application Priority Data

Mar. 15, 2016 (KR) .................. 10-2016-0031113

(51) Int. Cl.
*C02F 1/46* (2006.01)
*C02F 1/467* (2006.01)
(Continued)

(52) U.S. Cl.
CPC ............ *C02F 1/4672* (2013.01); *B63J 4/002* (2013.01); *C02F 1/46109* (2013.01);
(Continued)

(58) Field of Classification Search
CPC .......... C02F 1/46; B63J 31/1691; C25B 9/00; C25B 9/18; C25B 9/20; H01M 8/24; H01M 8/246; C25C 7/00; C25D 17/00
See application file for complete search history.

(56) References Cited

U.S. PATENT DOCUMENTS

| 6,080,290 A * | 6/2000 | Stuart | ........................ C25B 9/20 204/255 |
| 2008/0198531 A1* | 8/2008 | Shiue | .................. C02F 1/46104 361/434 |
| 2013/0134080 A1* | 5/2013 | Shiue | ...................... C02F 1/463 210/192 |

* cited by examiner

*Primary Examiner* — Walter D. Griffin
*Assistant Examiner* — Cameron J Allen
(74) *Attorney, Agent, or Firm* — Panitch Schwarze Belisario & Nadel LLP

(57) ABSTRACT

Disclosed is a 3-dimensional porous mono-polar electrode body that includes a 3-dimensional porous parent substance, which has a 3-dimensional structure including a side and a remaining side that communicate with each other via a plurality of pores arranged in multiple layers and which is made of a metal material to have dimensional stability, and an electrode catalyst layer applied on the 3-dimensional porous parent substance. The 3-dimensional porous mono-polar electrode body is used to remove microorganisms contained in treatment water to thus minimize the consumption of power, which is required to remove the microorgan-
(Continued)

isms, prevent secondary pollution, and ensure the durability of an electrode.

8 Claims, 9 Drawing Sheets

(51) Int. Cl.
    *C02F 1/461*     (2006.01)
    *E04H 4/12*     (2006.01)
    *B63J 4/00*     (2006.01)
    C02F 103/00     (2006.01)
    C02F 101/30     (2006.01)

(52) U.S. Cl.
    CPC ......... *E04H 4/1209* (2013.01); *E04H 4/1245* (2013.01); *C02F 1/4674* (2013.01); *C02F 2001/46142* (2013.01); *C02F 2001/46161* (2013.01); *C02F 2101/30* (2013.01); *C02F 2103/008* (2013.01); *C02F 2303/04* (2013.01)

Leakage Current

<prior art>

3-DIMENSIONAL POROUS MONO-POLAR ELECTRODE BODY, ELECTRIC STERILIZATION FILTER INCLUDING 3-DIMENSIONAL POROUS MONO-POLAR ELECTRODE BODY, AND WATER TREATMENT METHOD USING 3-DIMENSIONAL POROUS MONO-POLAR ELECTRODE BODY

BACKGROUND OF THE INVENTION

1. Field of the Invention

The present invention relates to a water treatment technology of removing microorganisms contained in treatment water, and more particularly to a 3-dimensional porous mono-polar electrode body, which is constituted to remove microorganisms contained in treatment water using an environmentally friendly process, an electric sterilization filter including the 3-dimensional porous mono-polar electrode body, and a water treatment method using the 3-dimensional porous mono-polar electrode body.

2. Description of the Related Art

As is well known to those skilled in the art, ballast water, well water, tap water, industrial water, pure water, ultra-pure water, bath water, swimming pool water, and industrial or domestic wastewater include various microorganisms, and a process of removing microorganisms has been introduced for the purposes of health and sanitation where necessary.

Korean Patent No. 10-1220891 discloses a 3-dimensional porous multi-polar electrode, an electric sterilization filter including the 3-dimensional porous multi-polar electrode, and a water treatment method using the 3-dimensional porous multi-polar electrode. The technology is characterized in that 3-dimensional electrodes are arranged in a multi-polar form. However, for this technology, since the 3-dimensional electrodes are arranged in a multi-polar arrangement, current leakage is nonlinearly amplified and generated, thereby reducing current efficiency. Further, due to leakage current, hydrogen generation stress, which is applied to a hydrogen electrode, occurs in a complicated manner so as to overlap a portion that is wider than the portion of an electrode to which hydrogen generation stress is originally intended to be applied. Accordingly, a catalyst coat is significantly lost due to hydrogen generation, and this loss occurs at a speed that is difficult to track.

CITATION LIST

Patent Document

Korean Patent No. 10-1220891

SUMMARY OF THE INVENTION

Accordingly, the present invention has been made keeping in mind the above problems occurring in the related art, and an object of the present invention is to provide a 3-dimensional porous mono-polar electrode body that includes a 3-dimensional porous parent substance, which has a 3-dimensional structure including one side and a remaining side that communicate with each other due to a plurality of pores arranged in multiple layers and which is made of a metal material so as to have dimensional stability. The 3-dimensional porous mono-polar electrode body is used to remove microorganisms, which are contained in treatment water, to thus minimize power consumption required to remove the microorganisms.

Another object of the present invention is to provide an environmentally friendly microorganism removal process using a 3-dimensional porous mono-polar electrode body to prevent or minimize the occurrence of an excessive amount of a germicide, for example, sodium hypochlorite, during electrolysis to thus prevent secondary pollution of the sea, which may be caused by the discharge of such a germicide.

Yet another object of the present invention is to provide a 3-dimensional porous mono-polar electrode body, which includes a parent substance made of a metal material, to thus secure the durability and maintain the original dimensions of an electrode, even beyond its service life.

Still another object of the present invention is to provide a mono-polar electrode arrangement structure so that current leakage is reduced, thereby improving current efficiency, with the result that the quantity of current used by a rectifier, which is used in an electrolysis system, is reduced due to the improved current efficiency, thereby reducing power consumption and the cost of parts.

Still yet another object of the present invention is to allow one electrode to have only positive or negative polarity to maintain hydrogen generation stress, which is applied to a hydrogen electrode, to thus easily predict a lifetime.

A further object of the present invention is to provide a separate means of regenerating a filter so as to convert the state of the filter into an initial state using a back washing or descaling process, so that the filter is semipermanently used.

In order to accomplish the above objects, the present invention provides a 3-dimensional porous mono-polar electrode body that includes an anode and a cathode each including a 3-dimensional porous parent substance, which has a 3-dimensional structure including a side and a remaining side communicating with each other via a plurality of pores arranged in multiple layers and which is made of a metal material, and a dielectric support member supporting the anode and the cathode with a predetermined interval therebetween. The anode includes an electrode catalyst layer, which is applied on the 3-dimensional porous parent substance, so that microorganisms contained in the treatment water are adsorbed and thus electrically removed, and an oxidant is generated to thus perform sterilization when electric current is applied thereto.

Further, according to the present invention, entangled thin metal wires may be pressed to a predetermined thickness to form the 3-dimensional porous parent substance, or a plurality of metal powders may be mixed with a binder to mold a mixture into a predetermined shape and the molded mixture may be then sintered to thus form the 3-dimensional porous parent substance.

Further, according to the present invention, the 3-dimensional porous parent substance may include pores having a diameter of 0.1 to 60 µm and may have a thickness of 0.5 to 5.0 mm.

Further, according to the present invention, the 3-dimensional porous parent substance may include carbon, nickel, cobalt, titanium, zirconium, niobium, tungsten, hafnium, hastelloy, stainless steel, iron, or mixtures, oxides, or alloys including two or more elements thereof.

Further, according to the present invention, an electrode catalyst layer may include platinum, palladium, rhodium, iridium, ruthenium, osmium, carbon, gold, tantalum, tin, indium, nickel, tungsten, manganese, or mixtures, oxides, or alloys including two or more elements thereof.

Further, according to the present invention, the cathode may further include the electrode catalyst layer applied on the 3-dimensional porous parent substance.

In order to accomplish the above objects, the present invention also provides an electric sterilization filter that includes a flow path tube including a flow path, a pair of power-feeding electrodes disposed with a predetermined interval therebetween in the flow path tube, one or more 3-dimensional porous mono-polar electrode bodies arranged to be connected with the pair of power-feeding electrodes, and a DC power supply for power feeding, which supplies direct current to the pair of power-feeding electrodes through first and second external leads. The 3-dimensional porous mono-polar electrode body includes the 3-dimensional porous mono-polar electrode body having the aforementioned constitution.

In order to accomplish the above objects, the present invention also provides a water treatment method that includes passing treatment water through the aforementioned electric sterilization filter and applying current to a pair of power-feeding electrodes while the treatment water is passed to adsorb microorganisms, which are contained in the treatment water, on a 3-dimensional porous mono-polar electrode body to thus electrically remove the microorganisms, and to also generate an oxidant to thus perform sterilization.

Further, according to the present invention, the polarity of an applied current, which is applied to the pair of power-feeding electrodes, may be reversed with a predetermined cycle to perform sterilization.

Further, according to the present invention, an electrolyte may be added to the treatment water to sterilize the treatment water using the electric sterilization filter.

In order to accomplish the above objects, the present invention also provides a ballast water treatment method using a ballast water treatment system, which includes a system including a seawater supply pump supplying seawater by pumping and a ballast water tank for seawater storage, the aforementioned electric sterilization filter, and an indirect sterilizer electrolyzing the seawater to manufacture hypochlorous acid at a concentration of 1000 ppm or more. The method includes passing the seawater through the electric sterilization filter and applying current to a pair of power-feeding electrodes while the seawater is passed to adsorb microorganisms, which are contained in the seawater, on a 3-dimensional porous mono-polar electrode body to thus electrically remove the microorganisms, and also to generate an oxidant to thus perform sterilization.

Further, according to the present invention, the electric sterilization filter may be positioned at the front end of the indirect sterilizer.

Further, according to the present invention, the electric sterilization filter may be positioned at the rear end of the indirect sterilizer.

According to the present invention, a 3-dimensional porous mono-polar electrode body includes a 3-dimensional porous parent substance, which has a 3-dimensional structure including a side and a remaining side that communicate with each other via a plurality of pores arranged in multiple layers and which is made of a metal material to thus have dimensional stability. The 3-dimensional porous mono-polar electrode body is used to remove microorganisms contained in treatment water to thus minimize the consumption of power, which is required to remove the microorganisms, such minimization of power consumption being considered a significant merit in regions to which limited electric power is supplied, such as ships.

Further, the present invention provides an environmentally friendly microorganism removal process using a 3-dimensional porous mono-polar electrode body to prevent or minimize the occurrence of an excessive amount of germicides, for example, sodium hypochlorite, during electrolysis to thus prevent secondary pollution.

Further, the present invention provides a 3-dimensional porous mono-polar electrode body, which includes a parent substance made of a metal material, to thus secure the durability and maintain the initial dimensions of an electrode even beyond the service life thereof.

Further, according to the present invention, since one electrode has only positive or negative polarity, a cathode, in which a catalyst component does not serve a significant role in practice and at which hydrogen is generated, may be used after pre-treatment without catalyst coating, and accordingly, the catalyst coating amount may be reduced by half.

Meanwhile, a known multi-polar electrode is operated while one electrode has two polarities, and accordingly, catalyst coats are eluted from both sides of all electrodes in amounts that are similar to each other. However, even upon operation after both the anode and the cathode of the present invention are subjected to catalyst coating and then replaced for the purpose of descaling, the load applied to one electrode is reduced by half compared to known multi-polar electrodes, and accordingly, the lifetime of the catalyst coat is increased about 1.5 to 2 times.

Further, the present invention provides a mono-polar electrode arrangement structure that reduces the current leakage occurring in the known multi-polar electrode arrangement structure. The current leakage is reduced to thereby improving current efficiency, and the quantity of current used by a rectifier, which is used in an electrolysis system, is reduced due to the improved current efficiency, thereby reducing power consumption and the cost of parts.

Further, according to the present invention, there is no unpredictable non-linear performance gradient of the electric sterilization filter, which is caused by the current leakage, and a pair of electrodes act based on the same mechanism due to mono-polar arrangement. Accordingly, the performance of the electrode is secured and predictable, and it is possible to cope with such an unpredictable gradient.

Meanwhile, current leakage reduces the current efficiency of the electric sterilization filter, which includes electrodes arranged in a multi-polar arrangement, and, due to the current leakage, hydrogen generation stress, which is applied to the hydrogen electrode, occurs in a complicated manner to thus overlap a portion that is wider than the portion of an electrode to which hydrogen generation stress is originally intended to be applied. Accordingly, a catalyst coat is significantly lost due to the generation of hydrogen, and the loss occurs at a speed that is difficult to track. However, according to the present invention, one electrode has only positive or negative polarity to maintain hydrogen generation stress, which is applied to the hydrogen electrode, to thus easily predict a lifetime.

Meanwhile, when the known multi-polar electrode is re-processed or replaced, all electrodes must be replaced. However, according to the present invention, the non-coated parent substance of the hydrogen electrode that does not need to be descaled may be semipermanently used without replacement unless a significant problem occurs, and only the electrode of the oxygen electrode, that is, the anode, may be replaced for use, depending on the catalyst coating state of the parent substance of the oxygen electrode. Accordingly, the electrode of the present invention is easy to use and costs are reduced.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of a 3-dimensional porous mono-polar electrode body according to the present invention, an electric sterilization filter including the 3-dimensional porous mono-polar electrode body, and a water treatment method using the 3-dimensional porous mono-polar electrode body will be described in detail with reference to the accompanying drawings.

Figure 1:
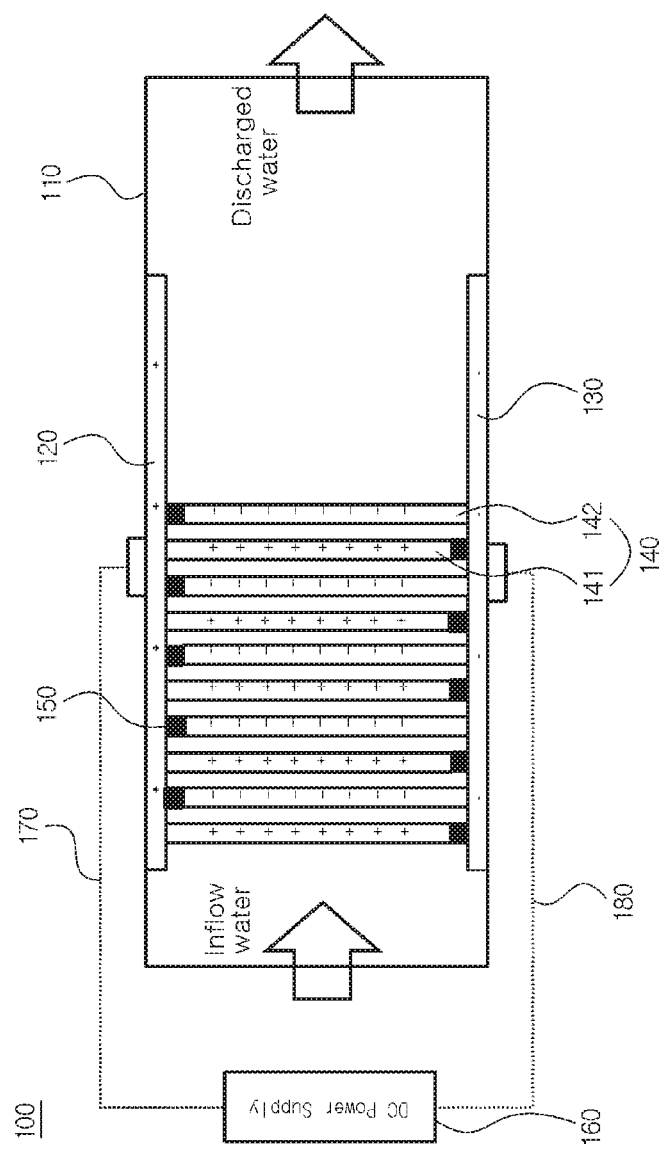
FIG. 1 is a view schematically showing the constitution of an electric sterilization filter according to an embodiment of the present invention.
Figure 2:
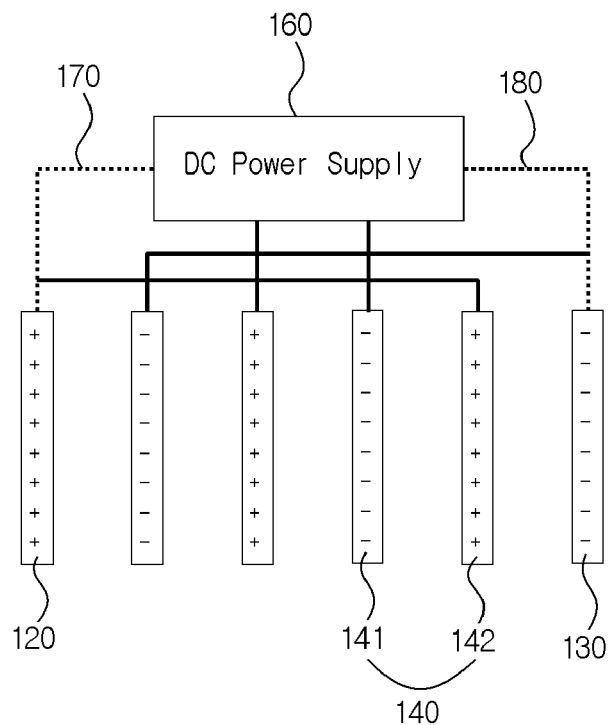
FIG. 2 is a view showing the concept of the 3-dimensional porous mono-polar electrode body shown in FIG. 1.

FIG. 1 is a view schematically showing the constitution of an electric sterilization filter according to an embodiment of the present invention, and FIG. 2 is a view showing the concept of the 3-dimensional porous mono-polar electrode body shown in FIG. 1.

As shown in FIG. 1, an electric sterilization filter 100 according to the present embodiment is opened at the front end and the rear end thereof. That is, the electric sterilization filter 100 is constituted so that target treatment water flows into the front end, is subjected to electric sterilization treatment, and is discharged through the rear end.

The electric sterilization filter 100 includes a flow path tube 110 including a flow path having a predetermined width and length, a pair of power-feeding electrodes 120 and 130 disposed with a predetermined interval therebetween in the flow path tube 110, one or more 3-dimensional porous mono-polar electrode bodies 140 arranged between the pair of power-feeding electrodes 120 and 130, a plurality of dielectric members 150, each of which come into contact with any one of the pair of power-feeding electrodes 120 and 130 at one side thereof and with the 3-dimensional porous mono-polar electrode body 140 at the other side thereof, so that the 3-dimensional porous mono-polar electrode bodies 140 sequentially secure an anode and a cathode, and a DC power supply for power feeding 160, which supplies direct current to the pair of power-feeding electrodes 120 and 130 through first and second external leads 170 and 180.

The flow path tube 110 has a circular or polygonal cross-section, and is made of a non-conductive material through which electricity does not flow. The power-feeding electrodes 120 and 130 are a mesh type, through which treatment water flows well, and the first and second external leads 170 and 180 are connected to ends of the power-feeding electrodes 120 and 130. The first and second external leads 170 and 180 are connected to the power-feeding electrodes 120 and 130 through holes which are radially formed through the flow path tube 110.

The 3-dimensional porous mono-polar electrode body 140 includes a pair including the anode and the cathode, each having any one of oxidation and reduction polar components depending on the direction of the current applied to one electrode, and the 3-dimensional porous mono-polar electrode body has porosity. That is, the 3-dimensional porous mono-polar electrode body 140 of the present embodiment includes an anode 141 and a cathode 142, each including a 3-dimensional porous parent substance that has a 3-dimensional structure including a side and a remaining side that communicate with each other via a plurality of pores arranged in multiple layers, and which is made of a metal material. The anode 141 must include an electrode catalyst layer applied on the 3-dimensional porous parent substance, so that microorganisms contained in treatment water are adsorbed to be electrically removed and an oxidant is generated to perform sterilization when electric current is applied thereto. The cathode 142 selectively includes the electrode catalyst layer applied on the 3-dimensional porous parent substance.

Meanwhile, when the 3-dimensional porous mono-polar electrode body 140 is not included in the electric sterilization filter 100 but is separately provided, the 3-dimensional porous mono-polar electrode body 140 may include a dielectric support member (not shown) supporting the anode 141 and the cathode 142, with a predetermined interval therebetween.

Entangled thin metal wires are pressed to a predetermined thickness to form the 3-dimensional porous parent substance, or a plurality of metal powders is mixed with a binder to mold a mixture into a predetermined shape and the molded mixture is then sintered to thus form the 3-dimensional porous parent substance.

The 3-dimensional porous mono-polar electrode bodies 140 are fixed to the pair of power-feeding electrodes 120 and 130 with a predetermined interval therebetween through the dielectric members 150, so that the 3-dimensional porous mono-polar electrode bodies 140 sequentially have the anode 141 and the cathode 142. Meanwhile, the power-feeding electrodes 120 and 130 and the 3-dimensional porous mono-polar electrode body 140 of the present embodiment are made of a conductive material.

Therefore, the current is supplied from the DC power supply for power feeding 160 through the first external lead 170 to the power feeding electrode 120 on one side of the electric sterilization filter 100. Subsequently, the current moves through the plurality of layers of the 3-dimensional porous mono-polar electrode body 140, the power feeding electrode 130 on the other side of the electric sterilization filter 100, and the second external lead 180, back to the DC power supply 160.

The 3-dimensional porous mono-polar electrode body 140 is monopolar. That is, as shown in FIG. 2, the 3-dimensional porous mono-polar electrode body 140 has the polarity of one anode 141 or cathode 142.

The sterilization procedure using the electric sterilization filter 100 of the present embodiment is as follows.

First is a process of adsorbing microorganisms on the 3-dimensional porous mono-polar electrode body 140. Second is a primary sterilization process of bringing microorganisms into contact with the 3-dimensional porous mono-polar electrode body 140 so as to oxidize the microorganisms while the microorganisms lose electrons and break enzymes, which are required for the vital activity of the microorganisms, to thus primarily remove the microorganisms. The third is a secondary sterilization process using oxidants, for example, chlorine, hydrogen peroxide, and various radicals (hydroxyl and carbonate), which are additionally generated due to oxidation and reduction reactions occurring in the 3-dimensional porous mono-polar electrode body 140.

The 3-dimensional porous mono-polar electrode body 140 has a characteristic whereby the microorganisms are adsorbed on the electrode and removed due to the voltage applied to the electrode. This may be inferred from the result of research on the microorganism removal process by Zimmerman. Zimmerman announced the research result that "When a potential difference around cell membranes of microorganisms is about 1 volt, dielectric breakdown of the cell membranes occurs to allow inner contents to flow from the cells to the outside, and accordingly, the microorganisms are removed" (Zimmerman, U., G. Pilwat, and F. Riemann, "Dielectric breakdown of cell membranes", Biophys. J. 1974 November; 14 11):88199).

The 3-dimensional porous mono-polar electrode body 140 has another characteristic in that microorganisms are easily removed using germicides, which are generated in an electrochemical catalyst reaction involving an electrolyte (water or chlorine ions are oxidized due to the electrochemical reaction to generate ozone molecules, OH radicals, $HO_2$ (hydroperoxyl radical), carbonate radicals, and chlorine) (Environ. Sci. & Technol., Vol. 12, No. 1, pp. 79-84, 1978, Environ. Sci. & Technol., Vol. 32, No. 1, pp. 63-70, 1998).

The 3-dimensional porous mono-polar electrode body 140 includes the 3-dimensional porous parent substance and the electrode catalyst layer applied on the parent substance. The catalyst layer of the anode 141 (oxidation side or positive side) of the 3-dimensional porous mono-polar electrode body 140 functions to electrically remove the microorganisms, which are adsorbed on the porous parent substance, and to generate ozone, OH radicals, and chlorine, which are germicides, during the electrochemical oxidation of water or salt water, which is the electrolyte. A hydrogen generation reaction occurs due to the reduction of water at the catalyst layer of the cathode 142 (reduction side or negative side).

Examples of catalyst metals suitable for both electrochemical oxidation and reduction processes include platinum, palladium, rhodium, iridium, ruthenium, osmium, carbon, gold, tantalum, tin, indium, nickel, tungsten, manganese, antimony, niobium, Ebonex, or mixtures, oxides, or alloys including two or more elements thereof. Most preferably, such a catalyst mixture includes one or more of platinum, iridium, and ruthenium.

The 3-dimensional porous parent substance suitably includes a material that has a conductive function and is also capable of withstanding an oxidation-reduction atmosphere during the electrolysis process. Preferable examples of the material include carbon, nickel, cobalt, titanium, antimony, zirconium, niobium, tungsten, hafnium, hastelloy, stainless steel, iron, or mixtures, oxides, or alloys including two or more elements thereof.

With regard to shape, it is preferable that the 3-dimensional porous parent substance have a 3-dimensional structure including fibers of metal wires, granules, or metal particle powder. That is, entangled thin metal wires, such as fibers, may be pressed to a predetermined thickness to form the 3-dimensional porous parent substance, or a plurality of metal powders may be mixed with a binder to mold a mixture into a predetermined shape and the molded mixture is then sintered to thus form the 3-dimensional porous parent substance. Therefore, the 3-dimensional porous parent substance has a 3-dimensional structure that includes a side and a remaining side that communicate with each other via a plurality of pores arranged in multiple layers. The pores are formed between the thin metal wires overlapping each other, or are formed in spaces from which the binder is burnt to thus be removed during sintering. Further, the 3-dimensional porous parent substance is made of a metal material having dimensional stability to thus maintain its initial dimensions even beyond its service life.

The 3-dimensional porous parent substance may have a thickness of 10 mm or less, and preferably has a thickness of about 0.25 to 5.0 mm. The reason is that when the thickness is less than 0.25 mm, the drop in the pressure of inflowing fluid is increased due to the porosity.

The appropriate porosity of the 3-dimensional porous parent substance is about 10% or more, and preferably about 30 to 90%, expressed as a typical volume ratio. The reason is as follows. When the porosity is 10% or less, a pressure loss occurs while target treatment water passes through the porous parent substance, and accordingly, a filtration function, which is the original object, is not realized. When the porosity is 90% or more, there is no pressure drop, but it is difficult to adsorb the microorganisms present in the target treatment water on the porous parent substance, and accordingly, it is difficult to expect the desired sterilization effect.

A 3-dimensional porous parent substance having an average pore size of about 100 μm or less may be used, and it is preferable that the average pore size be 0.1 to 60 μm. The reason is that when the average pore size is 0.1 μm or less, a pressure drop occurs while target treatment water passes through the 3-dimensional porous parent substance, and when the average pore size is 60 μm or more, it is difficult to adsorb the microorganisms, which are present in target treatment water and have a size of about 50 μm, on the 3-dimensional porous parent substance, and accordingly, it is difficult to expect sterilization and filtration functions and a desired effect.

The process of forming the electrochemical catalyst layer on the 3-dimensional porous parent substance includes dipping the 3-dimensional porous parent substance in a catalyst precursor solution, which includes a precursor having a desired electrochemical catalyst component and a solvent in which the precursor is dissolved, and then sintering the resulting substance to form the 3-dimensional porous electrode. The process of forming the electrochemical catalyst layer of the present embodiment is not limited to the aforementioned process. Various catalyst coating processes using spin coating, slot die coating, brushing, spraying, or electro-spraying may be applied, in addition to the dipping process.

It is preferable that the loaded amount of the catalyst, which is applied to the 3-dimensional porous parent substance, be 0.24 to 24 mg/cm$^2$. The reason is as follows. When the loaded amount is 0.24 mg/cm$^2$ or less, since the loaded amount of the catalyst is small, catalytic activity, which exceeds activation energy, is very low, and accordingly, the current efficiency is insignificant and the concentration of generated hypochlorous acid is low, and thus the microorganism removal performance is limited. When the loaded amount is 24 mg/cm$^2$ or more, the sterilization effect is not largely increased in proportion to the loaded amount, but only the lifetime of the electrode is increased, and accordingly, loss occurs in terms of the cost of manufacturing the precious metal catalyst.

Appropriate examples of the material for terminals of the power-feeding electrodes 120 and 130, which supply electricity, include a titanium material, which is coated with platinum group oxides, a platinum-coated titanium material, a nickel material, a stainless steel material, hastellloy, a carbon material, a metal material, which is coated with a platinum group metal, or a conductive metal material, which is coated with a titanium material, such as copper.

The density of the current that is applied to the 3-dimensional porous mono-polar electrode body 140 of the present embodiment is preferably 1 to 1000 mA/cm$^2$. The reason is that when the current density is 1 mA/cm$^2$ or less, it is difficult to remove the microorganisms, and when the current density is 1000 mA/cm$^2$ or more, the catalyst may be damaged and durability may be reduced at high speeds due to the overcurrent.

The dielectric member 150 in the electric sterilization filter 100 of the present embodiment preferably includes a non-conductive material, such as glass, ceramics, resins, fibers, non-woven fabrics, Teflon, and molding, and it is preferable that the thickness be 0.25 to 5 mm and that the dielectric property be excellent.

Figure 3:
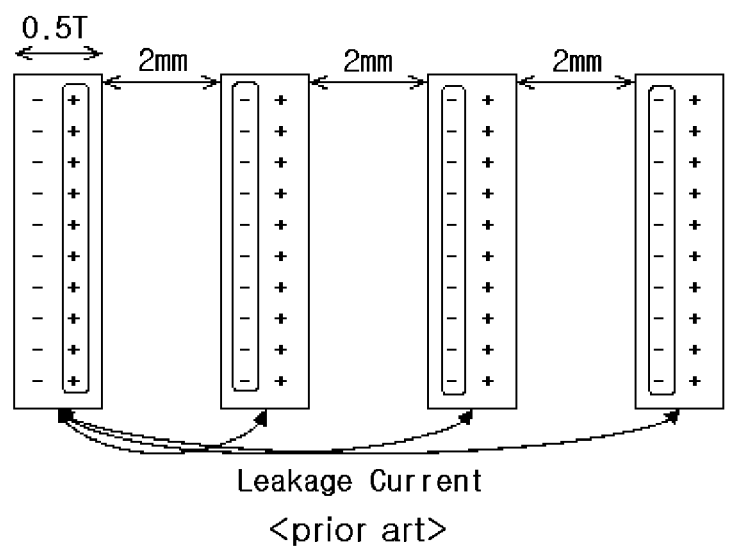
FIG. 3 is a mimetic view showing current leakage from a known 3-dimensional porous multi-polar electrode.

FIG. 3 is a mimetic view showing the current leakage of the 3-dimensional porous multi-polar electrodes, which are arranged in a multi-polar form, when the current is applied thereto. For a multi-polar electrode arrangement, an electrode is electrified to thus have polarity that is opposite that of the opposite electrode. Both terminal surfaces of the porous electrode, which have the polarity of about 0.25 to 2 T, are electrified to be separated into the anode and the cathode, the porous fibers have a diameter of several μm, and the lines of the fibers are 3-dimensionally connected to form the electrode. Accordingly, electrode separation, which is caused by electrification, is not well defined compared to a plate-type electrode.

That is, the plate-type electrode includes both sides, which do not communicate with each other, thereby allowing current leakage only at the portion of both sides at which the current leaks. However, the 3-dimensional porous multi-polar electrode has a drawback in that the current may leak in all directions due to the pores in the 3-dimensional structure. When the current leaks in an amount that is larger than the expected or designed value, the current leakage acts as a factor that greatly reduces the chlorine generation efficiency, that is, the performance, of the electrode. However, when current is applied to the 3-dimensional porous mono-polar electrode, no current leaks at all, and accordingly, the 3-dimensional porous mono-polar electrode arrangement is more stable than the multi-polar electrode arrangement in terms of the use or performance of the electrode.

Figure 4:
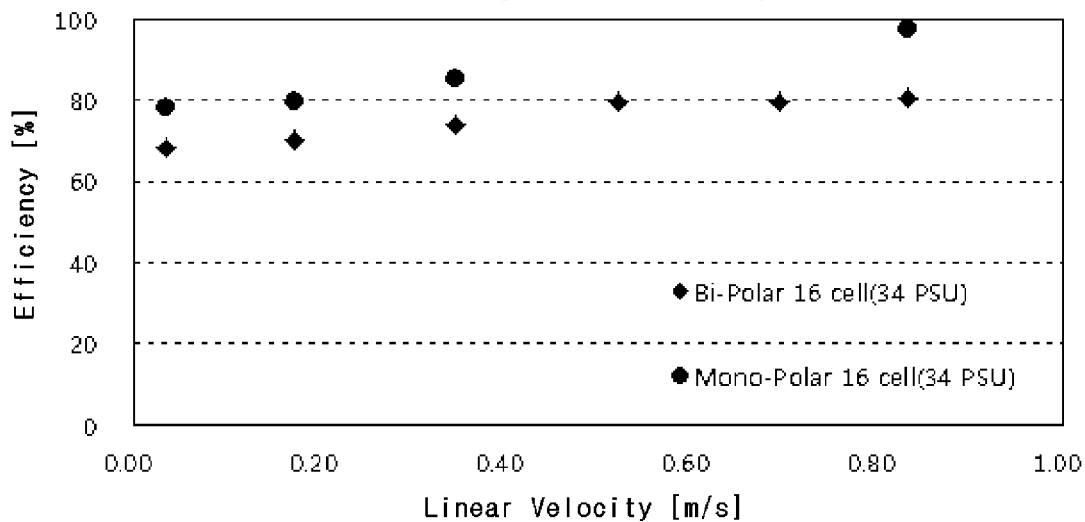
FIG. 4 is a graph showing the efficiency of electrolysis depending on the arrangement of electrodes in a BWTS in which electrolysis is performed.

FIG. 4 is a graph showing the efficiency of electrolysis depending on the arrangement of electrodes in a BWTS electrolyzing seawater in an amount of 0.75 tons per hour. As shown in FIG. 4, current efficiency is higher in the mono-polar electrode arrangement than in the multi-polar electrode arrangement. The reason is that no current leakage occurs in the mono-polar electrode arrangement, as is shown in FIG. 3. In practice, the current significantly leaks from four to fifty multi-polar cells, not one cell, and accordingly, an apparent difference in current efficiency occurs between the multi-polar and mono-polar electrodes. Further, as the current density is increased, the amount of current at the corner and at the 3-dimensional structure is increased, thereby increasing the current leakage. Accordingly, the difference in current efficiency, which is shown in FIG. 4, is increased more than the increase in current density.

Figure 5:
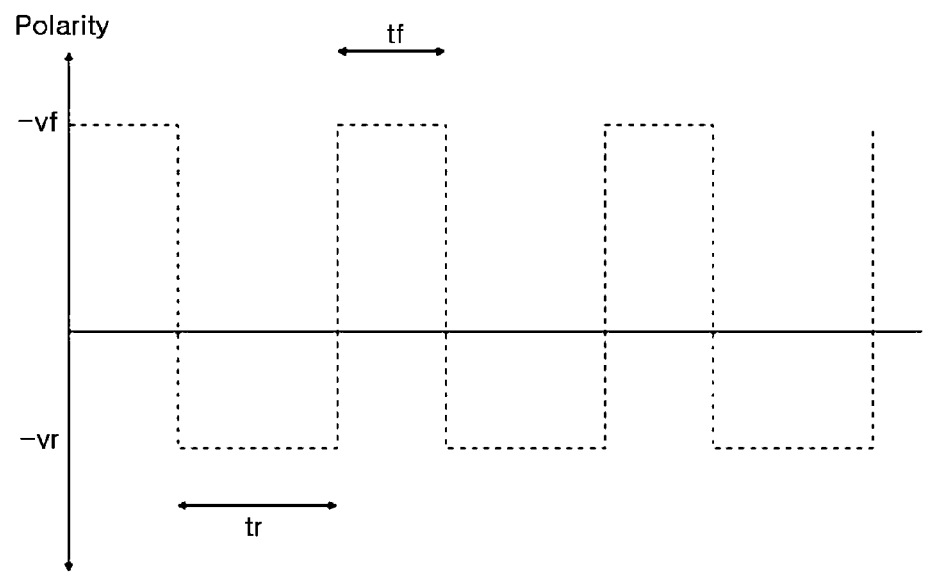
FIG. 5 is a graph showing the reversal of polarity of a voltage, which is applied to an electrode when target treatment water is electrically sterilized, according to the embodiment.

FIG. 5 is a graph showing the reversal of polarity of the voltage applied to the electrode when target treatment water is electrically sterilized. When a first applied voltage $V_f$ is applied to the electric sterilization filter and the polarity of the applied voltage is then reversed, a second applied voltage $V_r$ is lower than or the same as the first applied voltage $V_f$, and the voltage having the reversed polarity is applied. When the aforementioned reversal of the polarity is not adopted, Ca or Mg ions, which are included in seawater or fresh water, form hydroxides or oxides during operation over a long period of time and become attached to the electrode in an insoluble salt form to thus form scales. Accordingly, the current density and hypochlorous acid generation and sterilization efficiencies of the electrode are reduced. The microorganisms are adsorbed on the 3-dimensional porous mono-polar electrode body 140, and the adsorbed microorganisms are removed due to the voltage applied to the electrode or germicides generated at the electrode. The microorganisms, which are removed using the 3-dimensional porous mono-polar electrode body 140, may be easily removed at the electrode. For this, the adsorbed microorganisms may be more easily removed and new microorganisms may be easily adsorbed on the 3-dimensional porous mono-polar electrode body 140 when the polarity of the voltage is repeatedly reversed, thereby increasing the sterilization effect. Meanwhile, the aforementioned Ca and Mg scales may be treated using various treatment processes, and may be dissolved out in the form of chemical ions having the reverse polarity when the reversed voltage is applied. The amount of hypochlorous acid that is generated may be insignificant on the side that is not coated with the catalyst. However, the removal of the microorganisms is based not on the mechanism that relates to the amount of hypochlorous acid that are generated, but on the reversal of the polarity to dissolve the ions. Accordingly, only the voltage of the non-coated electrode may be slightly high, but the slightly high voltage is not considered to be a big problem when operation is performed while the operation current density is less than 100 to 200 A/cm$^2$, which is a typical current density.

When the first applied voltage is $V_f$ and the second applied voltage is $V_r$, it is preferable that the $V_r/V_f$ ratio be 1 to 0.5, that each change cycle of the feeding times $t_f$ and $t_r$ be about 15 to 60 min, and that the feeding time $t_f$ of the first applied voltage $V_f$ be more than the feeding time $t_r$ of the second applied voltage $V_r$. It is preferable that the polarity be reversed in the manner of $+V_f \rightarrow -V_r \rightarrow +V_f$. The generation of scale may be suppressed and a sterilization effect of a predetermined level or higher may be secured over a long period of time using the aforementioned polarity reversal. Therefore, it is preferable that the electric sterilization filter of the present embodiment further include a controller applying the current having the reversed polarity to perform a descaling process or back washing.

Figure 6:
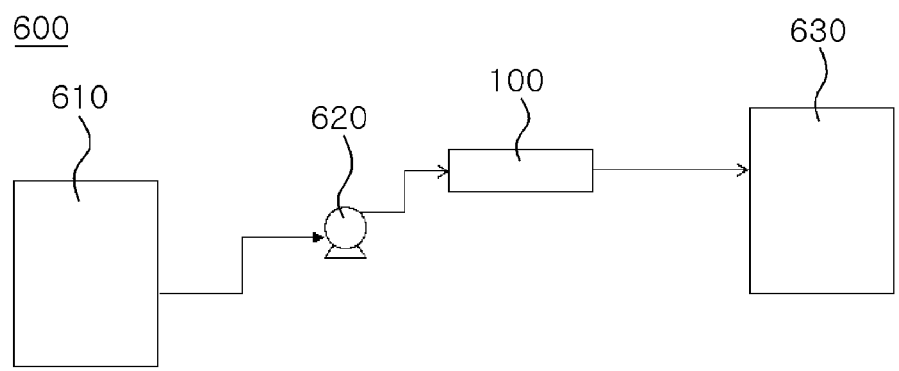
FIG. 6 is a view schematically showing another water treatment system using the electric sterilization filter according to the embodiment.

FIG. 6 is a view schematically showing a water treatment system using the electric sterilization filter according to the embodiment. As shown in FIG. 6, the water treatment system 600 of the present embodiment treats water using the aforementioned electric sterilization filter 100, and includes a first storage tank 610 storing target treatment water, a supply pump 620 supplying target treatment water from the first storage tank 610, the electric sterilization filter 100, through which target treatment water, supplied using the supply pump 620, is electrically sterilized, and a second storage tank 630 storing the electrically sterilized treatment water.

Figure 7:
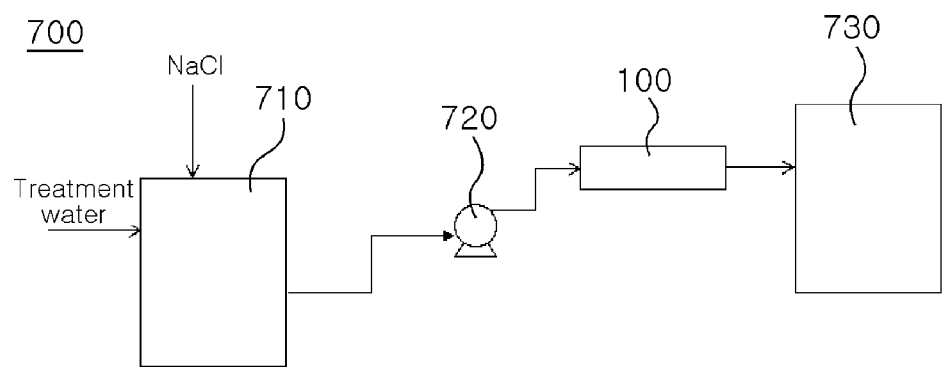
FIG. 7 is a view schematically showing a swimming pool water treatment system using the electric sterilization filter according to the embodiment.

FIG. 7 is a view schematically showing another water treatment system using the electric sterilization filter according to the embodiment. As shown in FIG. 7, the water treatment system 700 of the present embodiment treats water using the aforementioned electric sterilization filter 100, and the electrolyte is added to the target treatment water so as to treat the water. That is, the water treatment system 700 includes a storage tank 710 storing target treatment water, a supply pump 720 supplying target treatment water from the storage tank 710, the electric sterilization filter 100 electrically sterilizing target treatment water, the water being supplied using the supply pump 720, and a storage tank 730 storing the electrically sterilized treatment water. Examples of the electrolyte that is added to the target treatment water include salt (NaCl), potassium chloride (KCl), acids, and alkalis, and it is preferable that the concentration of the electrolyte be 0.1 to 3%. When the concentration of the electrolyte is 3% or more, chlorine may be generated in an excessive amount and may react with organic materials in the target treatment water, thereby generating byproducts.

The water treatment system 700 of FIG. 7 may be used in order to electrolyze organic materials rather than perform electric sterilization using the electric sterilization filter 100. That is, when an excessive amount of the organic materials is included in water, chlorides may be added to the target treatment water to perform electrolysis to thus effectively remove the organic materials and the chromaticity.

Figure 8:
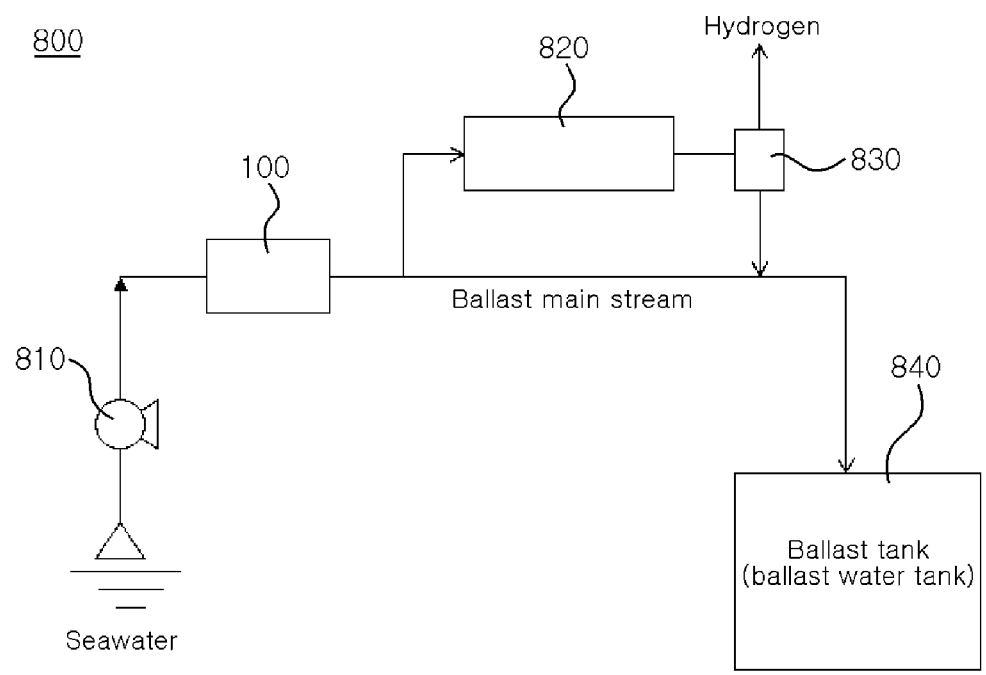
FIG. 8 is a view schematically showing a ballast water treatment system using the electric sterilization filter according to the embodiment.

FIG. 8 is a view schematically showing a ballast water treatment system using the electric sterilization filter according to the embodiment. As shown in FIG. 8, a ballast water treatment system 800 of the present embodiment is applied using both a direct sterilization process using the aforementioned electric sterilization filter 100 and an indirect sterilization process using an indirect sterilizer. That is, the ballast water treatment system 800 of the present embodiment includes a known system, which includes a seawater supply pump 810, supplying seawater by pumping, and a ballast water tank 840 for seawater storage, the aforementioned electric sterilization filter 100, an indirect sterilizer 820, and a hydrogen separator 830.

The electric sterilization filter 100 is positioned at the front end of the indirect sterilizer 820 to adsorb plankton 50 μm or more in size to thus remove plankton using sterilization. The indirect sterilizer 820 electrolyzes salt, which is a component of seawater, to manufacture hypochlorous acid in a concentration of 1000 ppm or more and supply hypochlorous acid to a ballast main line. In the ballast water treatment system 800 having the aforementioned constitution according to the present embodiment, the chlorine concentration of the ballast main stream may be maintained at 5 ppm or less. Therefore, the chlorine concentration may be maintained lower than the chlorine concentration in the known case where ballast water is treated using only the indirect sterilizer 820 (the chlorine concentration of the ballast main stream is maintained at 20 ppm), and accordingly, the amount of byproducts created by the reaction with organic materials may be reduced, and energy consumption may be reduced 75%.

Meanwhile, the ballast water treatment system 800 of the present embodiment may further include a small-sized pump for back washing, which forces a fluid to flow in the opposite direction relative to that of the ballast main stream, a valve, and a controller controlling the pump and the valve to thus restore the porosity of the electrode of the electric sterilization filter 100 using back washing.

Figure 9:
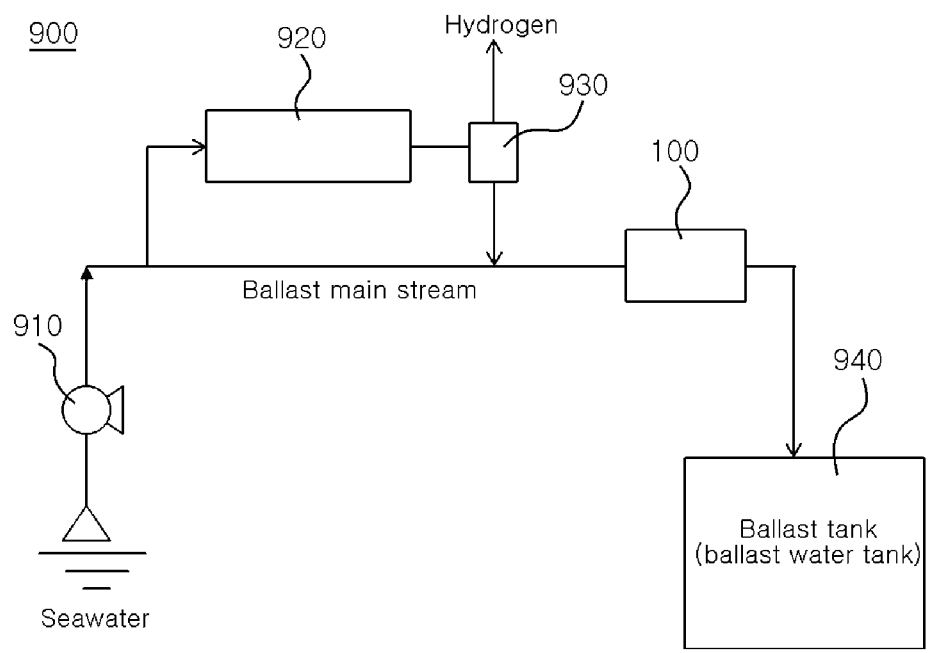
FIG. 9 is a view schematically showing another ballast water treatment system using the electric sterilization filter according to the embodiment.

FIG. 9 is a view schematically showing another ballast water treatment system using the electric sterilization filter according to the embodiment. As shown in FIG. 9, the ballast water treatment system 900 of the present embodiment is the same as the ballast water treatment system 800 of FIG. 8, except that the electric sterilization filter 100 is positioned at a rear end of an indirect sterilizer 920. That is, the ballast water treatment system 900 of the present embodiment includes a known system, which includes a seawater supply pump 910, supplying seawater by pumping, and a ballast water tank 940 for seawater storage, the electric sterilization filter 100, an indirect sterilizer 920, and a hydrogen separator 930.

Figure 10:
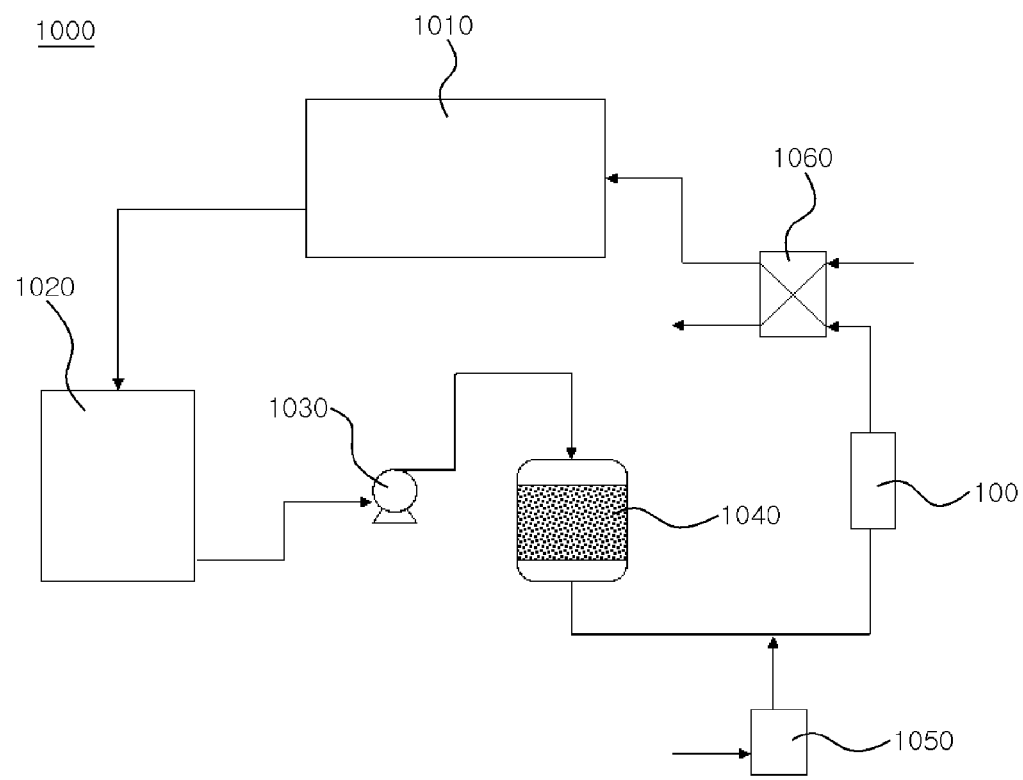
FIG. 10 is a view schematically showing the swimming pool water treatment system using the electric sterilization filter according to the embodiment.

FIG. 10 is a view schematically showing a swimming pool water treatment system using the electric sterilization filter according to the embodiment. As shown in FIG. 10, the swimming pool water treatment system 1000 of the present embodiment treats water in a swimming pool using the aforementioned electric sterilization filter 100. That is, the swimming pool water treatment system 1000 of the present embodiment removes pollutants and microorganisms from a swimming pool 1010 using a circulation process.

The swimming pool water treatment system 1000 includes a balance tank 1020, which is an intermediate tank controlling the flow rate of circulation water, a circulation pump 1030, which pumps water from the balance tank 1020 to circulate water, a filter 1040, through which pollutants included in water circulating using the circulation pump 1030 are removed, a sterilizer 1050, which electrolyzes salt water in a sodium hypochlorite liquid chlorine injection device or field to generate sodium hypochlorite and then supply the sodium hypochlorite through the filter 1040 to a fluidization line in which fluidization occurs (the structure of a field-type sodium hypochlorite generator is shown in FIG. 10), the electric sterilization filter 100, which electrically sterilizes water containing sodium hypochlorite, and a heat exchanger 1060, which heat-exchanges water electrically sterilized using the electric sterilization filter 100.

The electric sterilization filter 100 may be provided at the rear end of the filter 1040 to effectively decompose organic and inorganic materials, which are contained in water, in addition to providing a sterilization function, and accordingly, the load of polluted material in the filter 1040 may be reduced, thereby maintaining a long water back washing cycle. Therefore, the amount of water that is used in the swimming pool may be reduced, thus reducing the amount of energy required to heat the water. Meanwhile, the electric sterilization filter 100 may be provided at the front end of the filter 1040 to exhibit the aforementioned performance.

Hereinafter, the present invention will be described based on various Experimental Examples, but the embodiments of the present invention are not limited thereto.

Experimental Example 1

In Experimental Example 1, the microorganisms were electrically removed using the 3-dimensional porous mono-polar electrode body 140.

A. Electric Sterilization Filter and Water Treatment System Using the Same (See FIGS. 1 and 6)

(1) 3-Dimensional Porous Anode 141

Parent substance: Titanium fibers each having a porosity of 57.5%, an average pore diameter of 50±5 μm, a diameter of 10 cm, and a thickness of 0.5 mm Catalyst layer: The parent substance was chemically washed with acid, dipped or brushed in a solution that included chlorides, including palladium, iridium, and ruthenium (weight ratio of 1:0.4:0.3), and alcohol, and sintered to form a catalyst layer.

Number: 1

(2) 3-Dimensional Porous Cathode 142

Parent substance: Titanium fibers each having a porosity of 57.5%, an average pore diameter of 50±5 μm, a diameter of 10 cm, and a thickness of 0.5 mm were used as the parent substance without separate catalyst layer coating, and were subjected only to sandblasting and acid pre-treatment.

Number: 1

(3) Power-feeding electrodes 120 and 130: The mesh-type parent substance, which was made of the titanium material, was coated with palladium, iridium, and ruthenium to manufacture power-feeding electrodes. Meanwhile, the power-feeding electrodes 120 and 130, the 3-dimensional porous anode 141, and the 3-dimensional porous cathode 142 were securely connected using spot welding.

(4) Operating Condition of the Water Treatment System (FIG. 6)

The system of FIG. 6 was provided, and the experiment was performed using a process that included preparing water including *Pseudomonas diminuta* in the first storage tank 610, supplying target treatment water in an amount of 2 L/min to the electric sterilization filter 100 using the supply pump 620, and applying the current. The important operating factors are as follows.

Application of the current: The constant current of 0.1 A/cm$^2$ was applied based on the area of the electrode Electric sterilization filter passage speed: 1 sec Water was sampled from the first storage tank 610, which contained target treatment water stored therein, and the second storage tank 630, which contained electrically sterilized treatment water stored therein, and viable cells were counted.

B. Analysis (1) Measurement of Microorganisms

The agar plate process was performed using the agar medium (manufactured by Eiken Chemical Co., Ltd.) to measure the microorganisms. *Pseudomonas diminuta* was cultured using the liquid culture paper for one day, and fungi were subjected to centrifugation at 5,000 rpm, washed with pure water, and subjected to additional centrifugation. The resulting fungi were then added to tap water and distilled water (the residual chlorine concentration was 0.01 ppm or less), and the resulting water was used as target treatment water.

(2) Chlorine Analysis

Residual chlorine was measured using the standard method 4500 (Cl—B method I), and the salinity was measured using the Hach chlorine meter II.

C. Result

The measurement result is described in Table 1. From Table 1, it is confirmed that the system using the 3-dimensional porous mono-polar electrode body of the present Experimental Example definitely has an excellent microorganism removal effect.

Experimental Example 2

The applied current (voltage) was supplied in a pulse form under the same constitution and experimental conditions as Experimental Example 1 to compare microorganism removal abilities.

A. Electric sterilization filter and water treatment system using the same (see FIGS. 1 and 6)

(1) 3-dimensional Porous Mono-Polar Electrode Body 140: the Same as Experimental Example 1

(2) Power-Feeding Electrodes 120 and 130: the Same as Experimental Example 1

(3) Operating Condition of the Water Treatment System (FIG. 6)

The operation condition was the same as Experimental Example 1, and the current application condition was changed.

Application of the current: A constant current of 0.1 A/cm$^2$ was applied in a pulse form based on the area of the electrode (positive direction 30 min, and negative direction 30 min)

B. Analysis: the Same as Experimental Example 1

C. Result

The experimental result is described in Table 1. From Table 1, it was apparently confirmed that the system using the 3-dimensional porous mono-polar electrode body of the present embodiment had excellent microorganism removal efficiency.

TABLE 1

| Classification | Average voltage | Power consumption (Wh) | Initial microorganisms (CFU/ml) | Final typical microorganisms (CFU/ml) | Residual chlorine (mg/L) |
| --- | --- | --- | --- | --- | --- |
| Experimental Example 1 | 21.1 V | 84.3 | 14,300 | 1 | <0.1 |
| Experimental Example 2 | 26.3 V | 76.5 | 14,200 | 1 | <0.1 |

Comparison of Experimental Examples 1 and 2

From Table 1, it was confirmed that the electric sterilization filter 100 using the 3-dimensional porous mono-polar electrode body 140 of Experimental Examples 1 and 2, and the electric sterilization filtering process using the pulse-type electricity application of Experimental Example 2 had excellent microorganism removal efficiency even using low power.

Experimental Example 3

In Experimental Example 3, the microorganisms 50 μm or larger in size were electrically removed in order to check the possibility of applying the 3-dimensional porous mono-polar electrode body 140 of the present embodiment to the ballast water treatment process. The actual ballast water treatment process is shown in FIGS. 8 and 9. However, the ballast water treatment process was constituted to be the same as the process of FIG. 6 in order to check only the effect of electric sterilization filtering, which was performed to remove microorganisms 50 μm or larger in size, and then evaluated.

A. Electric Sterilization Filter and Water Treatment System Using the Same (see FIGS. 1 and 6)

(1) 3-Dimensional Porous Mono-Polar Electrode Body 140: the Same as Experimental Example 1

(2) Power-Feeding Electrodes 120 and 130: the Same as Experimental Example 1

(3) Target microorganisms: *Artemia salina* (hereinafter, referred to as "*A. salina*")

*Artemia salina* was purchased in a dehydrated cyst form and stored in a dark room at 4° C. 25 mL of the cyst was added to 1 L of artificial seawater and continuously aerated using air while being maintained at 28° C. during incubation for the purpose of use.

The incubation of *Artemia salina* was finished after 24 hours. Subsequently, the incubated *Artemia salina* was added to 200 L of artificial seawater, which was used as target treatment water, and continuously aerated.

B. System constitution and Operation

The system was constituted to be the same as the system of FIG. 6, and unrefined salt was added to tap water to manufacture about 30 gpl of artificial seawater having a final salinity of 30%. *A. salina* was added to the manufactured artificial salt water and stored in the first storage tank 610. Target treatment water was supplied to the electric sterilization filter 100 using the supply pump 620 at four different flow rates of 50 L/h (65.5 sec on the basis of residence time), 100 L/h (32.8 sec on the basis of residence time), 20 L/h (16.4 sec on the basis of residence time), and 300 L/h (10.9 sec on the basis of residence time), and a voltage of 0 to 20 V (corresponding to a current of 0 to 47 A) was applied for each flow rate.

Sterilized artificial seawater was sampled from the second storage tank 630, which contained electrically sterilized artificial seawater, and viable cell counts were taken during continuous operation. That is, 500 mL of water was sampled twice from the second storage tank 630 and collected in two sample beakers. 2 mL of the sodium thiosulfate solution (1 N) was added to one beaker immediately after sampling in order to decompose free chlorine, which was generated during electrolysis, and the sodium thiosulfate solution was not added to the other beaker. The first sample was used to count viable *A. salina* microorganisms, and the second sample was used to measure total residual chlorine. Sampling was repeated three times under predetermined flow rate and current conditions.

C. Analysis

| Target to be measured | Measurement method |
|---|---|
| Measurement method of microorganisms | Direct counts |
| Residual chlorine | Standard method 4500 Cl—B method I |

(1) Analysis of Microorganisms

Sampling and measurement of *A. salina* were repeated three times before and after electrolysis. The volume of each sample, which was used to measure *A. salina*, was 5 mL. Each sample was moved on the Petri dish (diameter of 90 mm), and measured using the colony counter apparatus. Whether *A. salina* survived or not was judged by observing the movement of microorganisms. The number of *A. salina* was represented by the number of microorganisms in 1 liter.

C. Result

Figure 11:
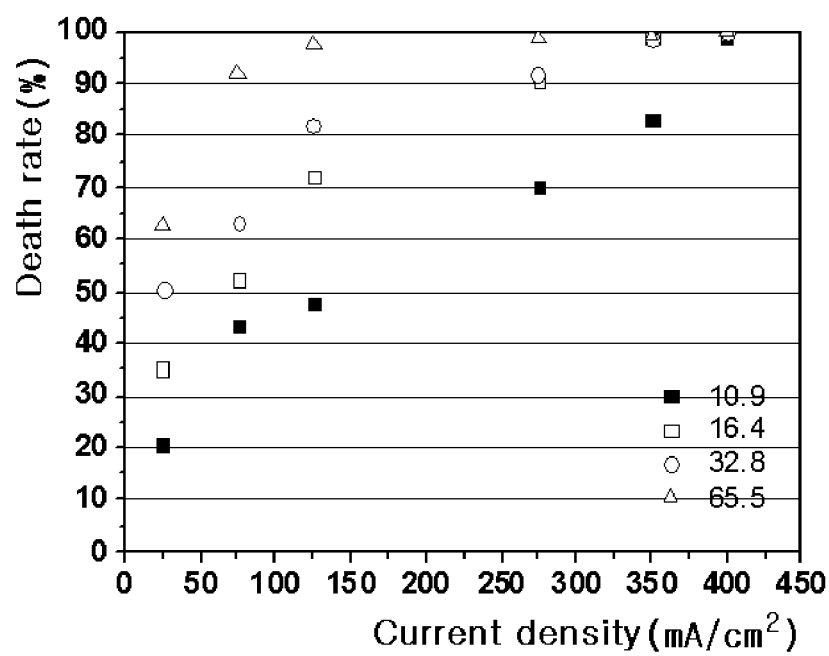
FIG. 11 is a graph showing the death rate of *A. salina* as a function of residence time and current density.

FIG. 11 is a graph showing the death rate of *A. salina* as a function of the residence time and the current density. As shown in FIG. 11, the death rate of *A. salina* was increased as the residence time and the current density were increased. Meanwhile, *A. salina* was completely removed under conditions of a residence time of 65.5 sec and a current density of 135 mA/cm$^2$. As shown in FIG. 11, the electric sterilization treatment process is a very effective process even for a very short residence time, for example, 1 min.

Comparative Example 1

A. Experimental procedure

In Comparative Example 1, the experiment was performed in a 500 mL conical flask in order to check the effect of hypochlorous acid, which is available on the market, as an inactivator of *Artemia salina*. Chemicals of hypochlorous acid were added to artificial seawater, and incubated *Artemia salina* was then added to the artificial seawater. The residual chlorine concentration was adjusted to 50, 100, and 200 mg/L. The number of *Artemia salina* that survived in the sample was counted after 5, 10, 15, 30, and 45 min.

B. Result

Figure 12:
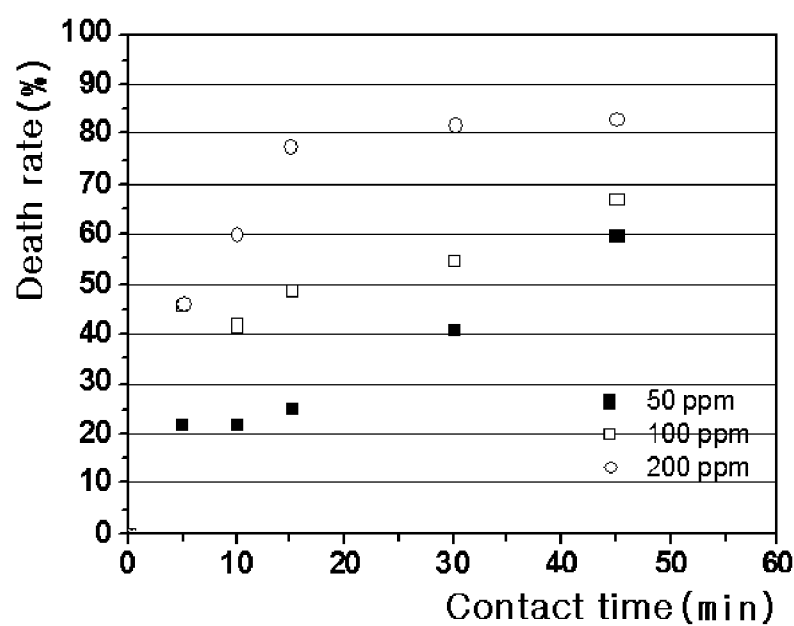
FIG. 12 is a graph showing the effect of sodium hypochlorite on the death of *A. salina*.

FIG. 12 shows the effect of sodium hypochlorite (free residual chlorine) on the death of *A. salina*. The residual chlorine concentration was set to 50, 100, and 200 mg/L, and the chlorine contact time was set to 0 to 45 min. Typically, the death of *A. salina* increased as the chlorine dose and the contact time were increased. The highest death rate (75% or more) of *A. salina* was obtained under the condition of a high chlorine concentration (200 mg/L) and a contact time of 15 min or more.

Comparative Example 2

A. Experimental Procedure

In Comparative Example 2, the experiment was performed to check the effect of residual chlorine and sodium thiosulfate on the proliferation of *Artemia salina*.

2 mL of the 1N sodium thiosulfate solution ($Na_2S_2O_3 \cdot 5H_2O$) was added to the conical flask. This amount of sodium thiosulfate solution was enough to remove 200 mg/L of residual chlorine.

B. Result

Figure 13:
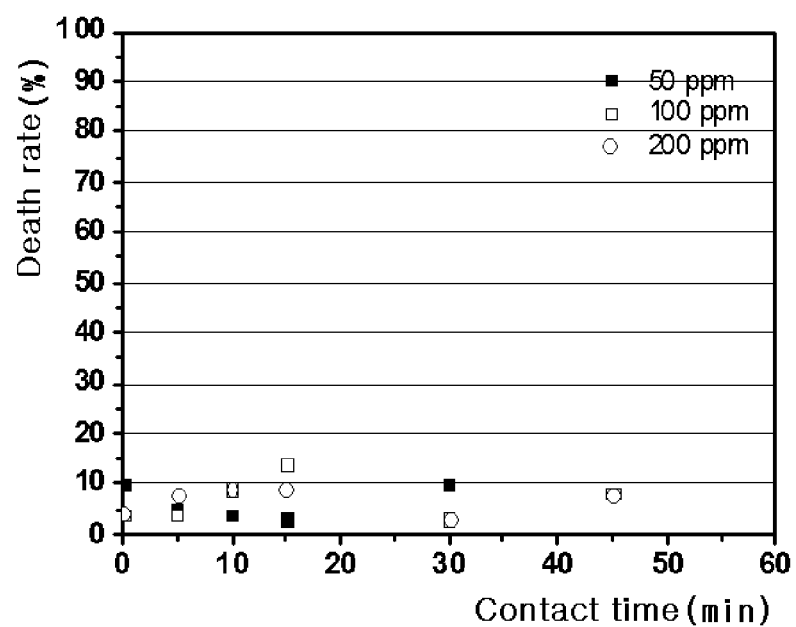
FIG. 13 is a graph showing the death rate of *A. salina* when chlorine is neutralized with sodium thiosulfate.

FIG. 13 shows the death rate of *A. salina* when chlorine is neutralized with sodium thiosulfate. As shown in FIG. 13, the death rate of *A. salina* did not exceed 14% under any set of chlorine dose and contact time conditions. This means that the death rate of *A. salina* is reduced due to dechlorination of the sample.

Comparison of Experimental Example 3, Comparative Example 1, and Comparative Example 2

Comparing the residual chlorine concentrations, a high concentration was obtained in a very short residence time during electrolysis. For example, the chlorine concentration was 475 mg/L when the current density was 135 mA/cm$^2$ and the residence time was 66.5 sec, and electrochemical treatment was more effective than sodium hypochlorite when the chlorine concentrations were the same. Meanwhile, the death rate of *A. salina* was higher in the case of electrochemical treatment than in the case in which sodium hypochlorite was used. This means that an inactivation mechanism results from combination with hypochlorous acid, which is generated at the electrode, as well as direction oxidation on the anode surface.

From the aforementioned results, the following conclusion is obtained.

First, sodium hypochlorite is a useful germicide, but the death rate is 75% when the chlorine concentration is high, namely 200 mg/L, and the contact time is 1.5 min or more. Second, electrochemical treatment provides a high death rate. That is, *A. salina* is 100% removed at a current density of 135 mA/cm$^2$ and a residence time of about 1 min. The residual chlorine concentration is about 400 mg/L under the aforementioned condition. Third, electricity consumption is about 0.07 to 19.2 kWh/m$^3$. Therefore, the optimum treatment condition includes a current density of 135 mA/cm$^2$, a residence time of 65.5 sec, and electricity consumption of 3.6 kWh/m$^3$ when the death rate of *A. salina* is 100%.

Experimental Example 4

In Experimental Example 4, the possibility of applying the 3-dimensional porous mono-polar electrode body 140 of the present embodiment to a typical water treatment process was examined.

A. Manufacture of the 3-dimensional Porous Mono-Polar Electrode Body 140: the Same as Experimental Example 1

B. Experimental Apparatus for Electrolysis 500 ml of pigsty wastewater was added to the beaker, the 3-dimensional porous mono-polar electrode body 140 was provided, and the experiment was performed in a batch manner under an operation condition of 0.2 A/cm$^2$ for 40 min. The properties of the pigsty wastewater used for the experiment correspond to the values when the time is 0 in Table 2.

C. Analysis

For the analysis of the physical and chemical characteristics of raw water and treatment water, the chromaticity was obtained using the absorbance method, ammoniacal nitrogen ($NH_3$—N) was obtained using the salicylate method, the electrolysis voltage of the electrochemical reaction was obtained using the multimeter, and the chlorine generation efficiency was obtained using the indirect iodometric titration method.

D. Result

The experimental result is described in Table 2. As seen from Table 2, the chromaticity was easily removed over time when the 3-dimensional porous mono-polar electrode body 140 was used.

Comparative Example 3

The chromaticity of pigsty wastewater of Table 2 was removed using a known 2-dimensional plate electrode (DSA electrode) under the conditions of the same size and the same current density. Electrode catalyst loading, the experimental apparatus, and the analysis method were the same as Experimental Example 1.

TABLE 2

| | Comparative Example 3 Typical titanium plate parent substance Pigsty wastewater | | | | Experimental Example 4 3-dimensional porous mono-polar electrode body Pigsty wastewater | | | |
|---|---|---|---|---|---|---|---|---|
| Time min | Voltage V | Chromaticity mg/L | $NH_3$ mg/L | Chlorine generation efficiency % | Voltage V | Chromaticity mg/L | $NH_3$ mg/L | Chlorine generation efficiency % |
| 0 | 0 | 87 | 527.5 | 0 | 0 | 87 | 527.5 | 0 |
| 10 | 7.5 | 72 | 466.5 | 4.3 | 7.2 | 51 | 421 | 6.7 |
| 20 | 7.4 | 107 | 388.5 | 2.3 | 7.1 | 48 | 355 | 5.3 |
| 30 | 7.3 | 173 | 291 | 1.5 | 7 | 22 | 230 | 4.3 |
| 40 | 7.2 | 172 | 203 | 1.1 | 7 | 6 | 158 | 3 |

Comparison of Results of Experimental Example 4 and Comparative Example 3

From Table 2, it could be confirmed that the chromaticity and ammonia were easily removed over time when the 3-dimensional porous mono-polar electrode body 140 of Experimental Example 4 was used, but that ammonia was removed but chromaticity was increased when the known plate electrode of Comparative Example 3 was used. The reason is considered that byproducts increasing the chromaticity are foiled during the reaction of the organic material providing the color and chlorine generated during the electrochemical reaction in the case of the plate electrode, but that the amount of organic material, which provides the color and is adsorbed on the 3-dimensional porous mono-polar electrode body 140 to be decomposed, is larger than the amount of the organic material, which is used during the reaction with chlorine, thereby reducing the chromaticity in the case of the 3-dimensional porous mono-polar electrode body 140.

Experimental Example 5

Electrolysis of the Electrolyte to Which Salt is Added

In Experimental Example 5, the possibility of applying the 3-dimensional porous mono-polar electrode body 140 of the present embodiment to wastewater, which contained the electrolyte of 1% salt water, was examined.

A. Manufacture of the 3-dimensional Porous Mono-Polar Electrode Body 140: the Same as Experimental Example 1

B. Experimental Apparatus for Electrolysis 500 ml of pigsty wastewater and salt were added to the beaker so that the concentration of salt water was 1%, and the 3-dimensional porous mono-polar electrode body 140 was provided in the electric sterilization filter. The test was performed in a batch manner under an operation condition of a current density of 0.2 A/cm$^2$ for 40 min. The components of pigsty wastewater, which was used during the experiment, had the values shown in Table 3 at time 0.

C. Analysis: the same as Experimental Example 4

D. Result

The experimental result is described in Table 3. Table 3 shows that the chromaticity was easily removed over time when the 3-dimensional porous mono-polar electrode body 140 was used.

Comparative Example 4

Salt was added to pigsty wastewater so that the concentration of salt was 1% in the electrolyte in Comparative Example 4, and the same current density, electrode catalyst loading, experimental apparatus, and analysis method as in Comparative Example 3 were applied to Comparative Example 4. The experimental result is described in Table 3.

TABLE 3

| | Comparative Example 4 Typical titanium plate parent substance Pigsty wastewater + electrolyte addition | | | | Experimental Example 5 3-dimensional porous mono-polar electrode body Pigsty wastewater + electrolyte addition | | | |
|---|---|---|---|---|---|---|---|---|
| Time min | Voltage V | Chromaticity mg/L | $NH_3$ mg/L | Chlorine generation efficiency % | Voltage V | Chromaticity mg/L | $NH_3$ mg/L | Chlorine generation efficiency % |
| 0 | 0 | 87 | 527.5 | 0 | 0 | 87 | 527.5 | 0 |
| 10 | 5.7 | 144 | 380 | 4.3 | 6.0 | 43 | 433 | 6.7 |
| 20 | 5.5 | 254 | 254 | 2.3 | 5.6 | 27 | 265 | 5.3 |
| 30 | 5.5 | 280 | 155 | 1.5 | 5.5 | 18 | 176 | 4.3 |
| 40 | 5.5 | 281 | 112 | 1.1 | 5.5 | 6 | 47 | 3 |

Comparison of Results of Experimental Examples 4 and 5 and Comparative Examples 3 and 4

As seen from Tables 2 and 3, the death rate of the chromaticity is higher in the case of the 3-dimensional porous mono-polar electrode body 140 of Experimental Examples 4 and 5 than in the case of the known plate electrode of Comparative Examples 3 and 4. From Experimental Examples 4 and 5, it can be seen that the electrolyte is added to increase the death rate of the chromaticity and ammonia.

The most preferred embodiments of an electric sterilization filter including a 3-dimensional porous mono-polar electrode body and a water treatment method using the 3-dimensional porous mono-polar electrode body according to the present invention have been described for illustrative purposes with reference to the accompanying drawings. Therefore, the present invention is not limited to the aforementioned embodiments, but those skilled in the art will appreciate that various modifications and changes are possible, without departing from the spirit and scope of the invention, and accordingly, the changes or modifications fall under the claims of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A ballast water treatment method using a ballast water treatment system, which includes a system including a seawater supply pump supplying a seawater by pumping and a ballast water tank for seawater storage, an electric sterilization filter, and an indirect sterilizer electrolyzing the seawater to manufacture hypochlorous acid at a concentration of 1000 ppm or more, the electric sterilization filter comprising a flow path tube including a flow path, a pair of power-feeding electrodes disposed with a predetermined interval therebetween in the flow path tube, one or more 3-dimensional porous mono-polar electrode bodies arranged to be connected with the pair of power-feeding electrodes, and a DC power supply for power feeding which supplies a direct current to the pair of power-feeding electrodes through first and second external leads, each 3-dimensional porous mono-polar electrode body comprising:

an anode and a cathode, each including a 3-dimensional porous parent substance, which has a 3-dimensional structure including a side and a remaining side that communicate with each other via a plurality of pores arranged in multiple layers and which is made of a metal material, and a dielectric support member supporting the anode and the cathode with a predetermined interval therebetween, the anode including an electrode catalyst layer which is applied on the 3-dimensional porous parent substance, so that microorganisms contained in a treatment water are adsorbed to be electrically removed and an oxidant is generated to perform sterilization when an electric current is applied, the method comprising:

passing the seawater through the electric sterilization filter, and applying a current to a pair of power-feeding electrodes while the seawater is passed to adsorb microorganisms, which are contained in the seawater, on the one or more 3-dimensional porous mono-polar electrode bodies to thus electrically remove the microorganisms, and to also generate an oxidant to thus perform sterilization.

2. The ballast water treatment method of claim 1, wherein entangled thin metal wires are pressed to a predetermined thickness to form the 3-dimensional porous parent substance, or a plurality of metal powders are mixed with a binder to mold a mixture into a predetermined shape and the molded mixture is then sintered to thus form the 3-dimensional porous parent substance.

3. The ballast water treatment method of claim 2, wherein the 3-dimensional porous parent substance includes pores having a diameter of 0.1 to 60 μm and has a thickness of 0.5 to 5.0 mm.

4. The ballast water treatment method of claim 2, wherein the 3-dimensional porous parent substance includes carbon, nickel, cobalt, titanium, zirconium, niobium, tungsten, hafnium, hastelloy, stainless steel, iron, or mixtures, oxides, or alloys including two or more elements thereof.

5. The ballast water treatment method of claim 2, wherein an electrode catalyst layer includes platinum, palladium, rhodium, iridium, ruthenium, osmium, carbon, gold, tantalum, tin, indium, nickel, tungsten, manganese, or mixtures, oxides, or alloys including two or more elements thereof.

6. The ballast water treatment method of claim 1, wherein the cathode further includes the electrode catalyst layer applied on the 3-dimensional porous parent substance.

7. The ballast water treatment method of claim 1, wherein the electric sterilization filter is positioned at a front end of the indirect sterilizer.

8. The ballast water treatment method of claim 1, wherein the electric sterilization filter is positioned at a rear end of the indirect sterilizer.

* * * * *